(12) United States Patent
Takagiwa

(10) Patent No.: US 9,667,129 B2
(45) Date of Patent: May 30, 2017

(54) POWER CONVERSION DEVICE WITH OVERCURRENT PROTECTION

(71) Applicant: FUJI ELECTRIC CO., LTD., Kawasaki (JP)

(72) Inventor: Kazumi Takagiwa, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 56 days.

(21) Appl. No.: 14/644,178

(22) Filed: Mar. 10, 2015

(65) Prior Publication Data

US 2015/0188410 A1 Jul. 2, 2015

Related U.S. Application Data

(63) Continuation of application No. PCT/JP2013/082557, filed on Dec. 4, 2013.

(30) Foreign Application Priority Data

Jan. 16, 2013 (JP) ................................ 2013-005797

(51) Int. Cl.
*H02M 1/32* (2007.01)
*H02M 7/5387* (2007.01)
*H02M 7/537* (2006.01)
*H02H 7/122* (2006.01)

(52) U.S. Cl.
CPC ............. *H02M 1/32* (2013.01); *H02M 7/537* (2013.01); *H02M 7/53871* (2013.01); *H02H 7/1225* (2013.01)

(58) Field of Classification Search
CPC .... H02M 1/32; H02M 7/537; H02M 7/53871; H02H 7/122; H02H 7/1225
USPC ............. 363/56.02, 56.03, 56.04; 361/31, 93
See application file for complete search history.

(56) References Cited

U.S. PATENT DOCUMENTS

| | | | | |
|---|---|---|---|---|
| 5,375,028 A | * | 12/1994 | Fukunaga | ............ H02H 7/1227 363/58 |
| 5,737,200 A | * | 4/1998 | Miyashita | ............ H02H 7/1227 363/56.03 |
| 6,801,058 B1 | * | 10/2004 | Jiandong | ................. H03F 3/217 327/20 |
| 8,072,241 B2 | | 12/2011 | Kouno | |

(Continued)

FOREIGN PATENT DOCUMENTS

| | | |
|---|---|---|
| JP | H09-191662 A | 7/1997 |
| JP | 2000-134855 A | 5/2000 |

(Continued)

*Primary Examiner* — Jye-June Lee
(74) *Attorney, Agent, or Firm* — Rabin & Berdo, P.C.

(57) ABSTRACT

A power conversion device, including first and second semiconductor switching elements, first and second free wheeling diodes respectively connected in reverse parallel to the first and second semiconductor switching elements, and first and second drive circuits configured to respectively on/off drive the first and second semiconductor switching elements. The first and second semiconductor switching elements are connected in series to form a half bridge circuit and are respectively disposed on upper and lower arms of the half bridge circuit. The second drive circuit includes an alarm signal generation circuit configured to generate different alarm signals upon detecting overcurrent in different arms of the half bridge circuit.

13 Claims, 7 Drawing Sheets

(56) References Cited

U.S. PATENT DOCUMENTS

| | | | | |
|---|---|---|---|---|
| 8,878,572 B2* | 11/2014 | Akiyama | ............... | H03K 5/153 |
| | | | | 327/108 |
| 2009/0057832 A1* | 3/2009 | Kouno | ................ | H01L 29/7397 |
| | | | | 257/577 |
| 2014/0321012 A1* | 10/2014 | Nakayama | ............ | H02M 1/088 |
| | | | | 361/57 |

FOREIGN PATENT DOCUMENTS

| JP | 2000-134955 A | 5/2000 |
|---|---|---|
| JP | 2006-032393 A | 2/2006 |
| JP | 2009-268336 A | 11/2009 |

* cited by examiner

POWER CONVERSION DEVICE WITH OVERCURRENT PROTECTION

This application is a continuation under 35 U.S.C. 120 of International Application PCT/JP2013/082557 having the International Filing Date of Dec. 4, 2013, which claims the priority of Japanese Patent Application No. JP PA 2013-005797, filed on Jan. 16, 2013. The identified applications are fully incorporated herein by reference.

TECHNICAL FIELD

The present invention relates to a power conversion device including an overcurrent protection function for semiconductor switching elements configuring a power conversion device main body.

BACKGROUND OF THE INVENTION

An inverter device which is a typical example of a power conversion device includes a power conversion device main body, such as is shown in FIG. 4, as a main portion which drives a load M such as a three-phase alternating current motor. The power conversion device main body is realized as a power semiconductor module (IPM) 10 packaged including six semiconductor switching elements Q1 to Q6 formed of, for example, IGBTs (insulated-gate bipolar transistors). This kind of inverter device supplies power to the load M by the semiconductor switching elements Q1 to Q6 being interrelatedly on/off driven by an unshown control circuit, as introduced in detail in, for example, PTL 1.

The semiconductor switching elements Q1 to Q6 in the power semiconductor module (IPM) 10, by being connected in series in pairs of two, form three sets of half bridge circuits HB. Also, six free wheeling diodes D1 to D6 are connected in reverse parallel to the respective semiconductor switching elements Q1 to Q6. The three sets of half bridge circuits HB, by being connected in parallel, form a three-phase full bridge circuit which drives the load M. A1 to A6 in FIG. 4 are drive circuits which on/off drive the respective semiconductor switching elements Q1 to Q6.

The three sets of half bridge circuits HB, by being interrelatedly driven by the control circuit, supply three-phase (U-phase, V-phase, and W-phase) currents, which are 120° different in phase from one another, to the load M from the respective middle points of the half bridge circuits HB. Herein, the middle points of the half bridge circuits HB refer to the series connection point of the semiconductor switching elements Q1 and Q4, the series connection point of the semiconductor switching elements Q2 and Q5, and the series connection point of the semiconductor switching elements Q3 and Q6.

Specifically, the upper-arm semiconductor switching elements Q1, Q2, and Q3 and lower-arm semiconductor switching elements Q4, Q5, and Q6 of the half-bridge circuits HB are on/off driven in accordance with a pulse-width modulated control signal of a constant cycle, as shown in (a) of FIG. 5. Specifically, the drive circuits A1 to A6, in accordance with the control signal, generate gate drive signals and on/off drive the respective semiconductor switching elements Q4, Q5, and Q6. As a result of the on/off drive, a current corresponding to the pulse width of the control signal is supplied to the load M via the upper-arm semiconductor switching element Q1 (Q2, Q3) over a positive half-cycle, as shown in (b) of FIG. 5. Also, a current corresponding to the pulse width of the control signal is supplied to the load M via the lower-arm semiconductor switching element Q4 (Q5, Q6) over a negative half-cycle, as shown in (c) of FIG. 5.

As a result of this, an alternating current forming a sine wave is supplied to the load M from each of the half bridge circuits HB, as shown in (d) of FIG. 5. However, the current supplied to the load M is practically a pulse current synchronized with the control signal, and the pulse current forms a discrete sine-wave current waveform. FIG. 5 only shows the output current of one half bridge circuit HB, but the same also applies to the output currents of the other half bridge circuits HB, except that the phases of the half bridge circuits HB are 120° different from one another.

Meanwhile, an overcurrent protection function is provided in the drive circuit A (A1 to A6) of this kind of power conversion device, as introduced in, for example, PTL 2. The overcurrent protection function monitors a current flowing through each semiconductor switching element Q (Q1 to Q6), and when detecting an overcurrent, stops the on/off drive of the semiconductor switching element Q (Q1, Q2 to Q6).

When the semiconductor switching element Q is an IGBT, as shown in, for example, FIG. 6, the monitoring of a current flowing through the semiconductor switching element Q is carried out by detecting, via a resistor R, a current output from a current detection terminal included in the IGBT as an auxiliary emitter. Further, the overcurrent detection is carried out by a comparator 1 comparing a detection voltage obtained in the resistor R in accordance with the current and a reference voltage Vref which defines a current limit voltage. When an overcurrent is detected in this way, the operation of a driver circuit 2 which on/off drives the semiconductor switching element Q is stopped by an output of the comparator 1, thereby fulfilling the overcurrent protection function.

3 in FIG. 6 is an alarm signal generation circuit which generates and outputs an alarm signal to the control circuit when an overcurrent is detected by the comparator 1. When a current flowing through the semiconductor switching element Q, that is, a detection current Ic obtained via the auxiliary emitter exceeds the current limit value acting as an overcurrent detection threshold value, as shown in, for example, FIG. 7, the alarm signal generation circuit 3 cyclically outputs an alarm signal with a predetermined pulse width after an operation delay time of the alarm signal generation circuit 3.

CITATION LIST

Patent Literature

PTL 1: JP-A-2000-134955
PTL 2: JP-A-2006-32393

BRIEF SUMMARY OF THE INVENTION

Technical Problem

However, the upper-arm semiconductor switching elements Q1, Q2, and Q3 of the half bridge circuits HB are driven in a high voltage region in which a voltage defined by the lower-arm semiconductor switching elements Q4, Q5, and Q6 is made a reference. Because of this, for example, a high-voltage floating circuit is incorporated in the drive circuits A1, A2, and A3 which drive the upper-arm semiconductor switching elements Q1, Q2, and Q3. The drive circuits A1, A2, and A3 operate by being level-shifted to a high voltage side of the control circuit by the high-voltage floating circuit. The lower-arm semiconductor switching elements Q4, Q5, and Q6 of the half bridge circuits HB operate with a ground potential as a reference. Consequently, the drive circuits A4, A5, and A6 which drive the lower-arm semiconductor switching elements Q4, Q5 and Q6, without the high-voltage floating circuit being incorporated therein, is directly driven by the control circuit.

Hence, it is often the case that only the overcurrent protection circuit is incorporated in the upper-arm drive circuits A1, A2, and A3, and that the alarm signal generation circuit 3 is omitted. Incidentally, when providing the alarm signal generation circuit 3 in each of the upper-arm drive circuits A1, A2, and A3, it is necessary to provide the high-voltage floating circuit and level-shift an alarm signal to a low voltage side. Consequently, even when an overcurrent occurs in the upper-arm semiconductor switching elements Q1, Q2, and Q3, and the protection function operates, it does not happen that an alarm signal is output from the drive circuits A1, A2, and A3. Because of this, the control circuit has the problem of not being able to monitor the occurrence of an overcurrent in the upper-arm semiconductor switching elements Q1, Q2, and Q3.

The invention, having been contrived bearing in mind these kinds of circumstances, has for its object to provide a power conversion device of a simple configuration wherein it is possible to output an alarm signal from a lower-arm drive circuit even when an overcurrent occurs in an upper-arm semiconductor switching element of a half bridge circuit.

Solution to Problem

A power conversion device according to an embodiment of the invention is configured including a power conversion device main body including a pair or a plurality of pairs of semiconductor switching elements, connected in series to form half bridge circuits, which are interrelatedly on/off driven, and a plurality of free wheeling diodes provided in reverse parallel one with each of the semiconductor switching elements; and a plurality of drive circuits which on/off drive the respective semiconductor switching elements of the power conversion device main body.

In particular, each of the drive circuits is provided with an overcurrent protection circuit which stops the on/off drive of the semiconductor switching element when a current flowing through the semiconductor switching element exceeds a current limit value. Also, the power conversion device is characterized in that the drive circuit of the lower arm of the half bridge circuits is further provided with an alarm signal generation circuit which generates a first alarm signal when the overcurrent protection circuit of the lower arm operates, and which generates a second alarm signal when a current flowing through the free wheeling diode connected in reverse parallel to the semiconductor switching element of the lower arm exceeds the current limit value.

Incidentally, the first and second alarm signals are formed of, for example, signals with different pulse widths generated in a predetermined cycle. Also, it is preferable that a current flowing through the semiconductor switching element is detected via a current detection terminal included in the semiconductor switching element, and that a current flowing through the free wheeling diode is detected via a current detection terminal included in the free wheeling diode.

The power conversion device is formed of one configuring an inverter device which switches a direct current voltage and supplies to a load an alternating current formed of a pulsed discrete sine-wave current waveform.

Advantageous Effects of Invention

According to the power conversion device of the heretofore described configuration, a current flowing through the upper-arm semiconductor switching element is equivalently detected from a current flowing through the free wheeling diode connected in reverse parallel to the lower-arm semiconductor switching element. Consequently, it is possible to output an alarm signal, from the drive circuit which drives the lower-arm semiconductor switching element, by detecting an overcurrent flowing through each of the lower-arm and upper-arm semiconductor switching elements. Moreover, by making the pulse widths of cyclically output alarm signals different from one another, it is possible to distinguish a semiconductor switching element in which an overcurrent has occurred.

Consequently, according to the power conversion device of the invention, when an overcurrent occurs in the upper-arm semiconductor switching element, it is possible to obtain an alarm signal from the lower-arm side drive circuit regardless of whether or not a high-voltage floating circuit is incorporated in the upper-arm drive circuit. Therefore, it is possible to reliably implement a protection operation for a power semiconductor module (IPM) configuring the power conversion device main body. Moreover, as the protection operation simply monitors a current flowing through the free wheeling diode, the configuration of the power conversion device is simple, thus producing an immense practical advantage.

DETAILED DESCRIPTION OF THE INVENTION

Figure 1:
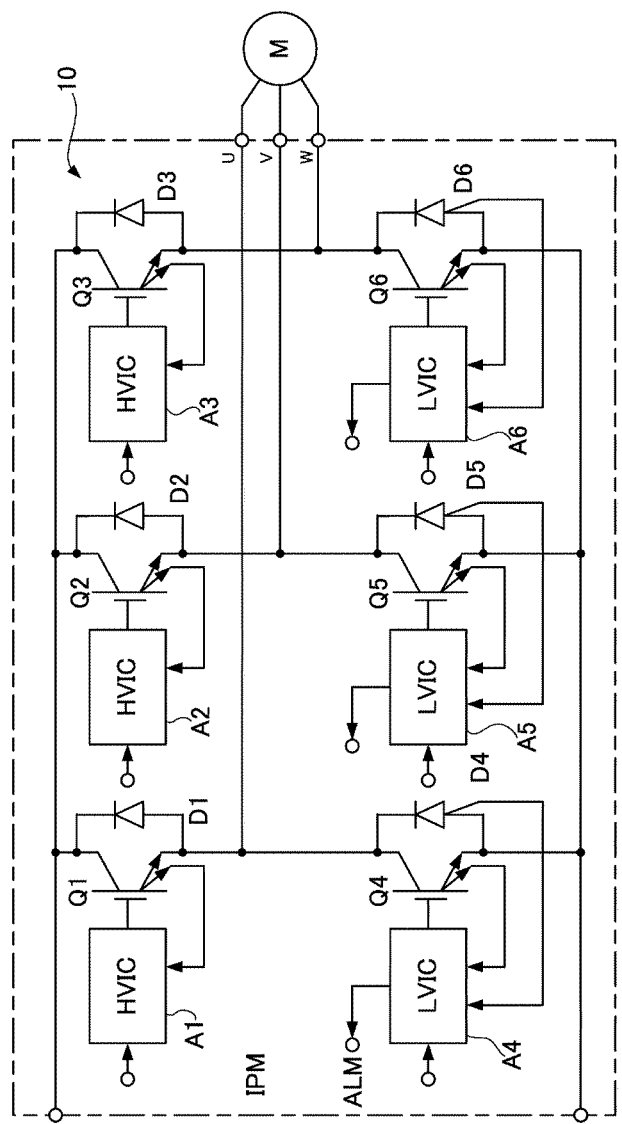
FIG. 1 is a main portion outline configuration diagram of a power conversion device main body forming a main portion of a power conversion device according to an embodiment of the invention.

Hereafter, a description will be given, referring to the drawings, of a power conversion device according to an embodiment of the invention.

The power conversion device according to the embodiment is basically configured in the same way as a heretofore known power semiconductor module (IPM) 10, as a main portion outline configuration of a power conversion device main body configuring the main portion of the power conversion device is shown in FIG. 1. That is, the power semiconductor module (IPM) 10 configuring the power conversion device main body is packaged including six semiconductor switching elements Q1 to Q6 and free wheeling diodes D1 to D6 connected in reverse parallel to the respective semiconductor switching elements Q1 to Q6. The semiconductor switching elements Q1 to Q6 are each formed of, for example, an IGBT.

Pairs of the semiconductor switching elements Q1 to Q6 and their respective pairs of the free wheeling diodes D1 to D6 form three sets of half bridge circuits HB provided in parallel. The three sets of half bridge circuits HB configure a three-phase full bridge circuit which drives a motor M acting as the load. Also, the semiconductor switching elements Q1 to Q6, by being interrelatedly on/off driven by the respective drive circuits A1 to A6, output currents in phases 120° different from one another.

Herein, the drive circuits A1 to A6, basically in the same way as in the heretofore known device, each include an overcurrent protection function which detects an overcurrent flowing through each respective semiconductor switching element Q1 to Q6 and stops the drive of the semiconductor switching elements Q1 to Q6. In particular, the lower-arm drive circuits A4, A5 and A6, in addition to the overcurrent protection function, further include the function of equivalently detecting currents flowing through the upper-arm semiconductor switching elements Q1, Q2, and Q3 from currents flowing through the free wheeling diodes D4, D5, and D6.

Further, the drive circuits A4, A5, and A6 generate alarm signals when having detected overcurrents of the semiconductor switching elements Q4, Q5, and Q6. Also, the drive circuits A4, A5, and A6 also further generate alarm signals when having detected overcurrents of the upper-arm semiconductor switching elements Q1, Q2, and Q3 from currents flowing through the free wheeling diodes D4, D5, and D6. As opposed to this, the previously described alarm signal generation function is omitted from the upper-arm drive circuits A1, A2, and A3.

Figure 2:
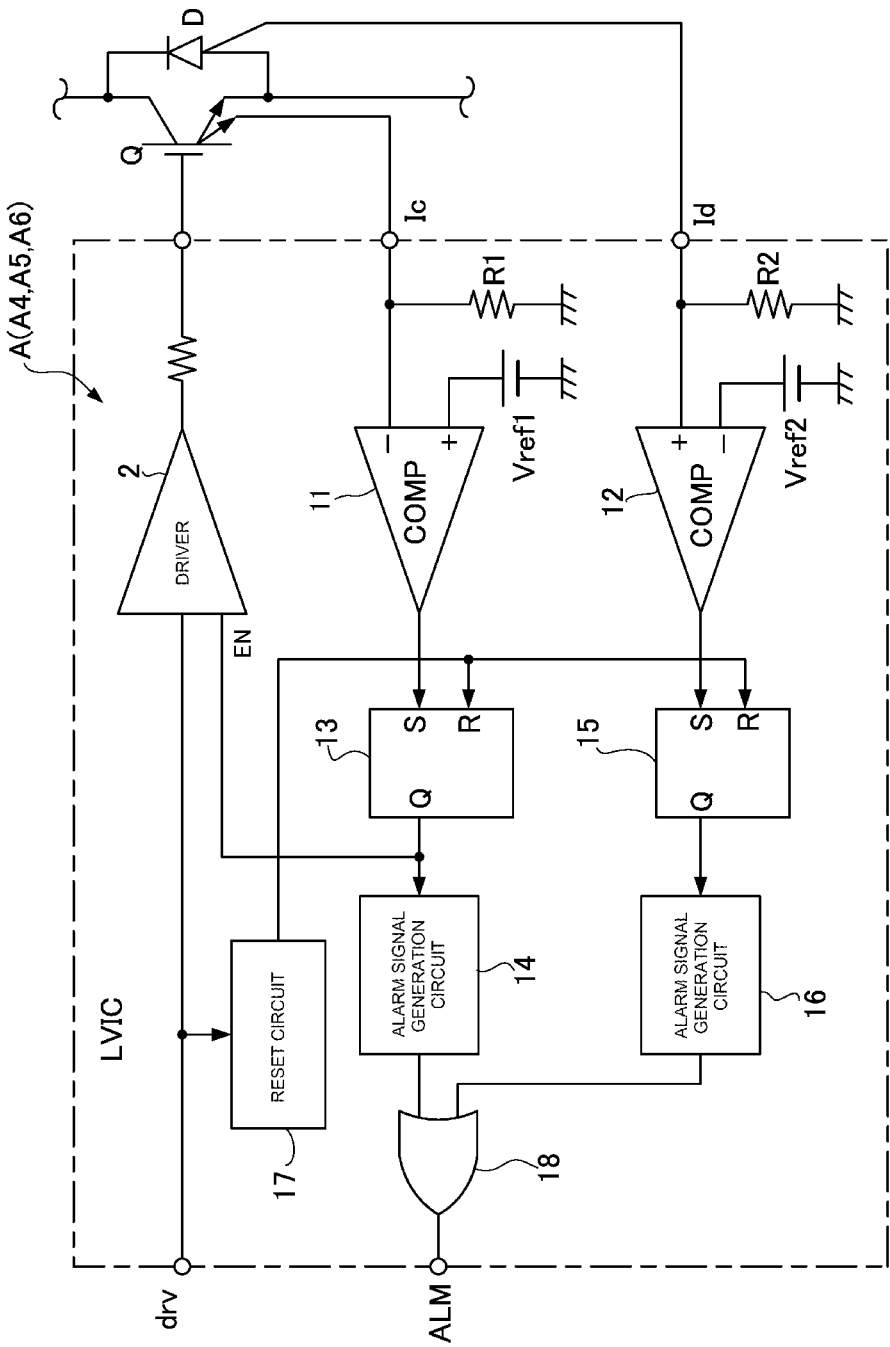
FIG. 2 is a diagram showing a configuration example of a lower-arm side drive circuit of the power conversion device main body shown in FIG. 1.

FIG. 2 shows an outline configuration of the lower-arm drive circuit A (A4, A5, A6). As shown in FIG. 2, the lower-arm drive circuit A (A4, A5, A6) includes a first comparator 11 which detects an overcurrent of the switching element Q (Q4, Q5, Q6). Furthermore, the lower-arm drive circuit A (A4, A5, A6) includes a second comparator 12 which equivalently detects an overcurrent of the upper-arm semiconductor switching element Q (Q1, Q2, Q3) from a current flowing through the free wheeling diode D (D4, D5, D6).

Incidentally, a current flowing through the semiconductor switching element Q is detected via a resistor R1 connected to a current detection terminal of the semiconductor switching element Q, specifically, to an auxiliary emitter included in the IGBT. The first comparator carries out the detection of an overcurrent of the semiconductor switching element Q by comparing a detection voltage obtained in the resistor R1 in accordance with a current Ic flowing through the semiconductor switching element Q and a reference voltage Vref1 which defines a current limit value.

Further, when an overcurrent of the semiconductor switching element Q is detected by the first comparator 11, a first flip-flop 13 is set by an output of the first comparator 11. The operation of a driver circuit 2 which on/off drives the semiconductor switching element Q is stopped by thus setting the first flip-flop 13. Also, at the same time, a first alarm signal generation circuit 14 is biased by setting the first flip-flop 13. Further, a first alarm signal with a predetermined pulse width is cyclically generated from the first alarm signal generation circuit 14.

Also, a current flowing through the free wheeling diode D is detected via a resistor R2 connected to an auxiliary cathode acting as a current detection terminal included in the free wheeling diode D. A current flowing through the free wheeling diode D corresponds to a current flowing through the upper-arm semiconductor switching element Q. The second comparator 12 carries out the detection of an overcurrent of the free wheeling diode D, equivalently, the detection of an overcurrent of the upper-arm semiconductor switching element Q, by comparing a detection voltage obtained in the resistor R2 in accordance with a current Id flowing through the free wheeling diode D and a reference voltage Vref2 which defines a current limit value.

Further, when an overcurrent of the upper-arm semiconductor switching element Q is detected by the second comparator 12, a second flip-flop 15 is set by an output of the second comparator 12. A second alarm signal generation circuit 16 is biased by thus setting the second flip-flop 15. Further, a second alarm signal with a pulse width different from the pulse width of the first alarm signal is cyclically generated from the second alarm signal generation circuit 16. The first and second alarm signals are output to the unshown control circuit via an OR circuit 18.

Figure 3:
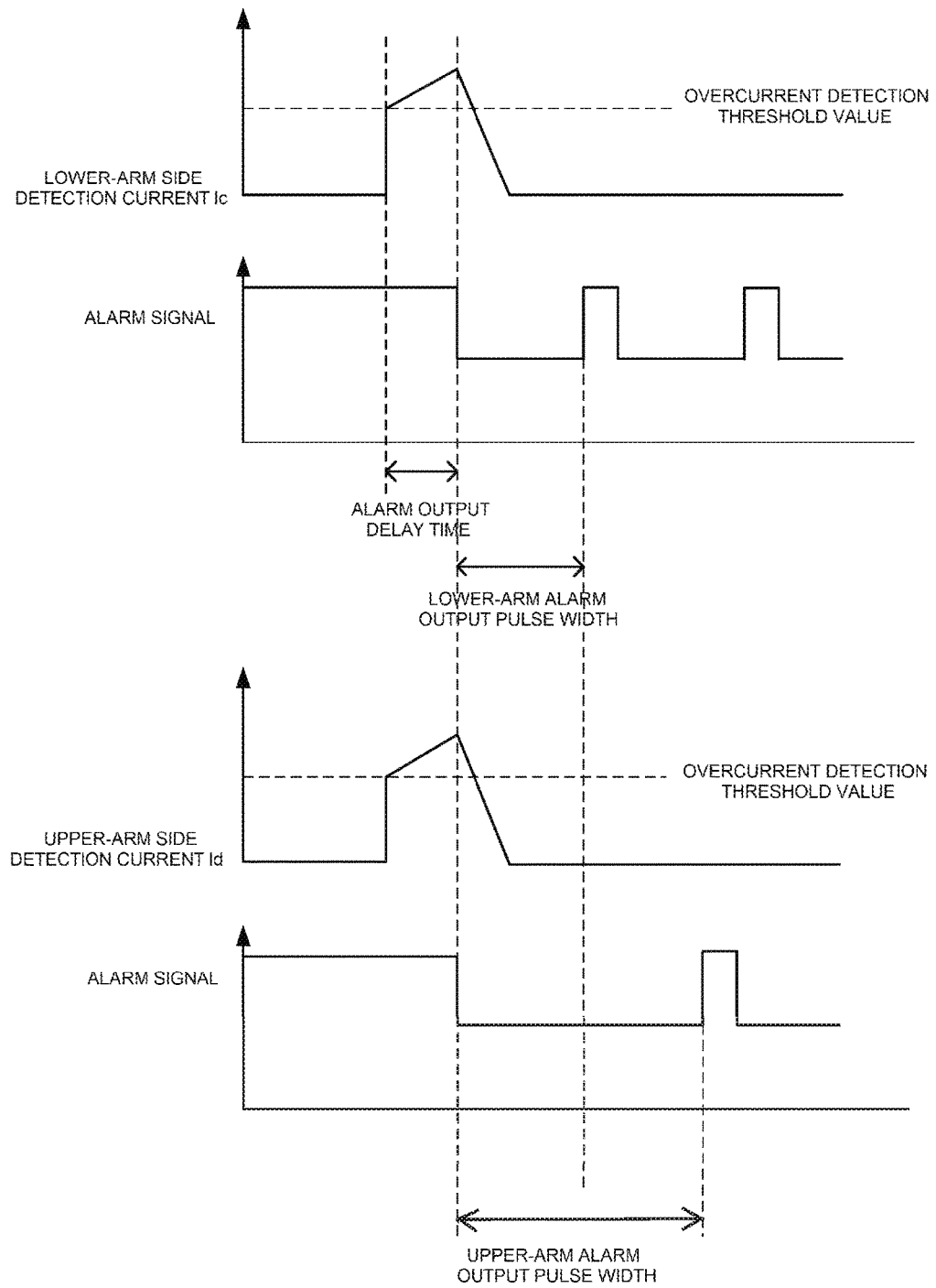
FIG. 3 is a diagram showing an overcurrent detection and alarm signal occurrence timing in the drive circuit shown in FIG. 2.
Figure 4:
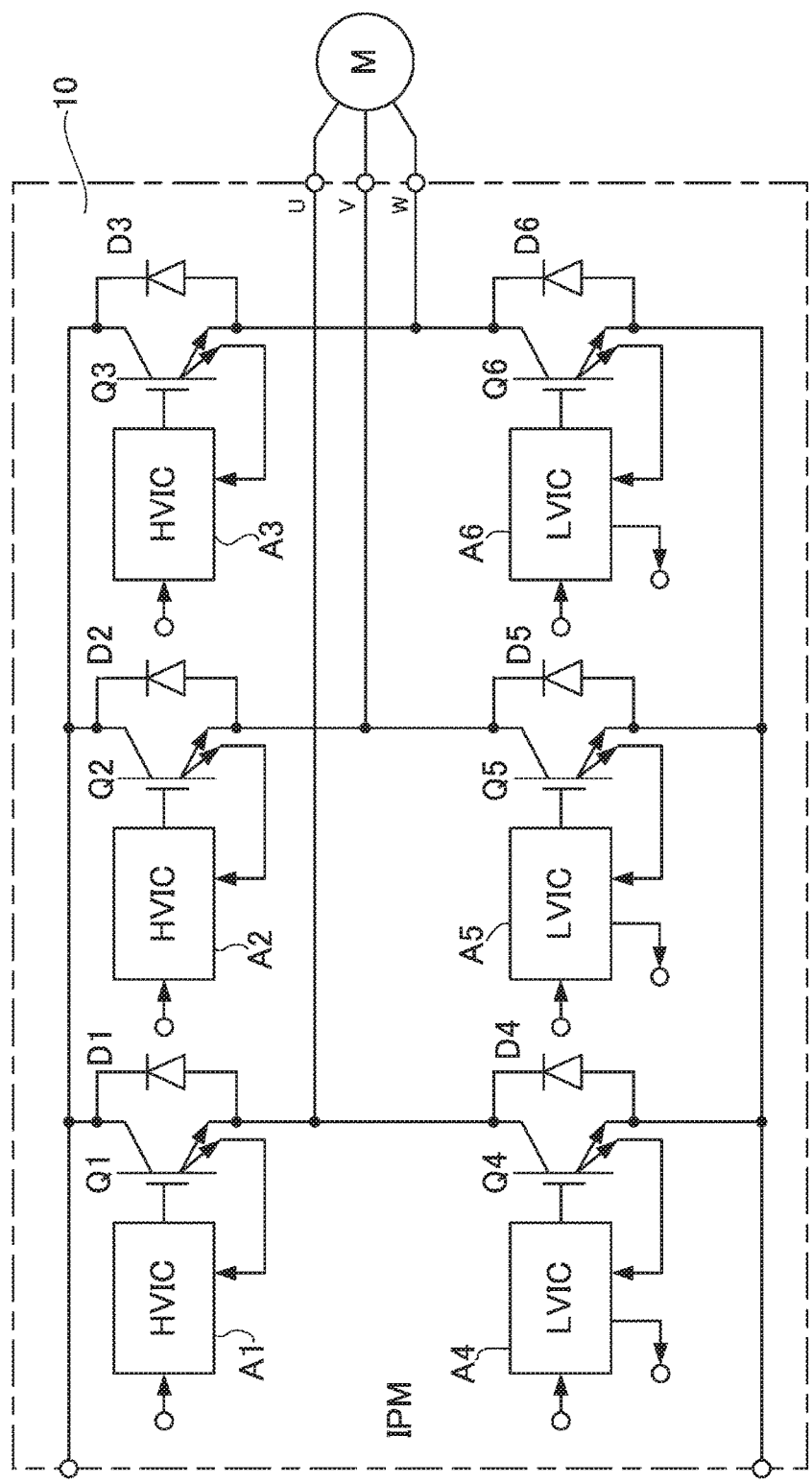
FIG. 4 is a main portion outline configuration diagram of a heretofore known power conversion device main body forming a main portion of a power conversion device.
Figure 5:
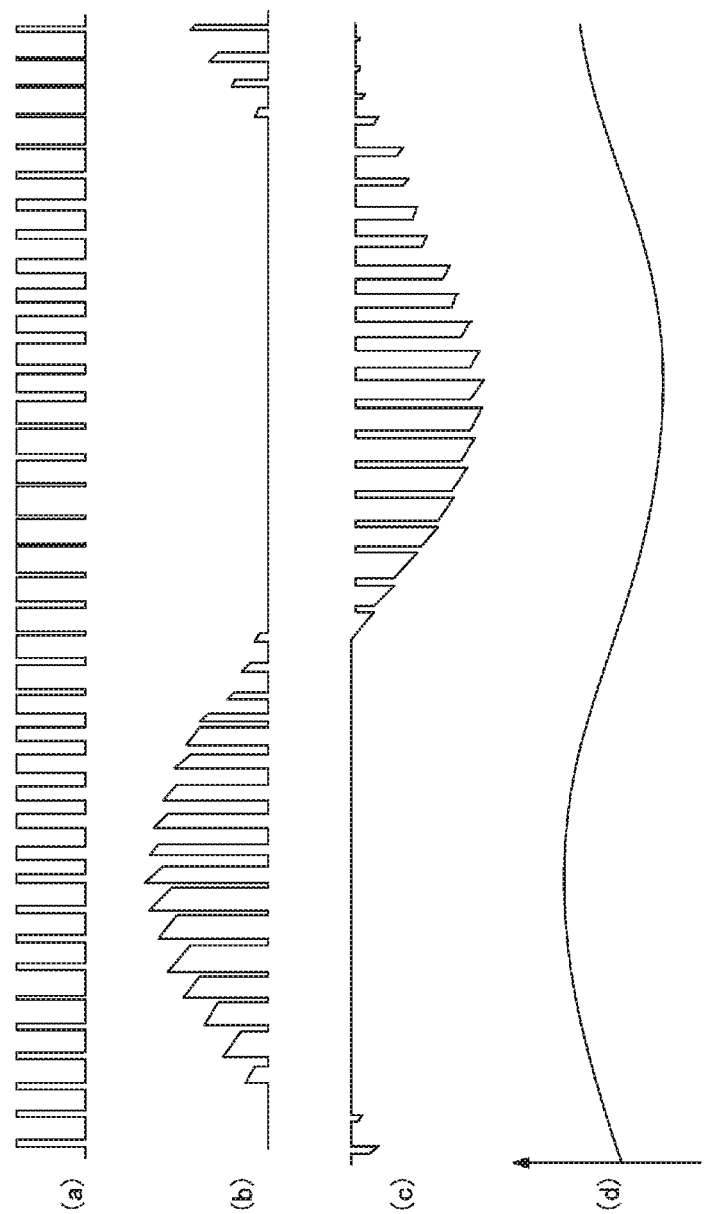
FIG. 5 is a diagram showing a relationship between a drive signal for a half bridge circuit and a current flowing through each of upper-arm and lower-arm semiconductor switching elements.
Figure 6:
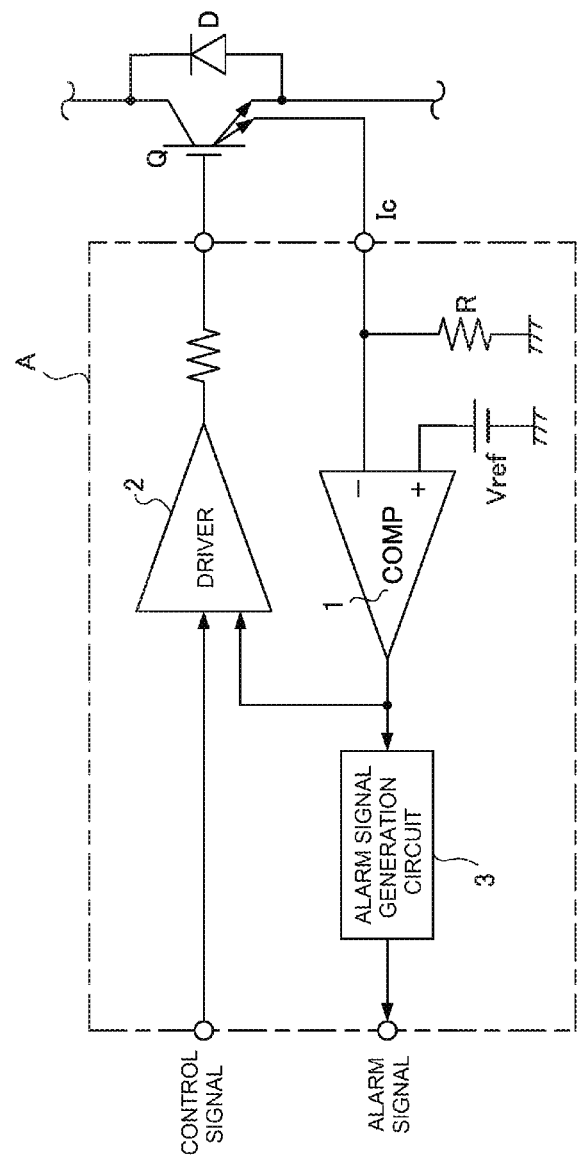
FIG. 6 is a diagram showing a configuration example of a drive circuit, of the power conversion device main body shown in FIG. 4, which includes an overcurrent protection function.
Figure 7:
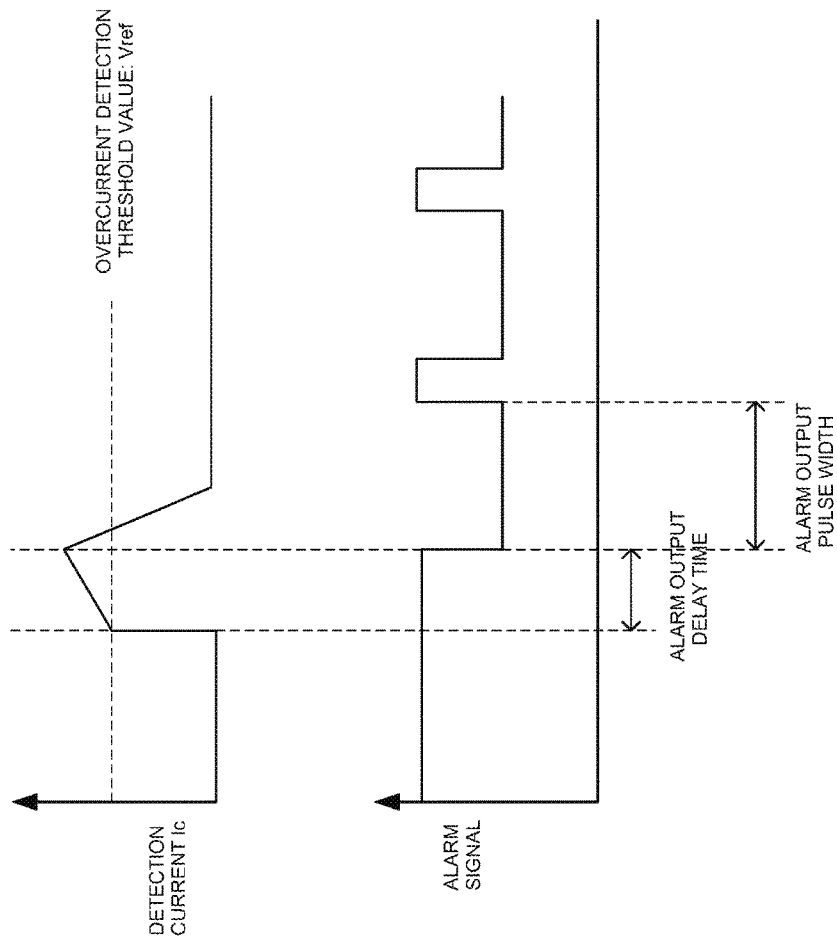
FIG. 7 is a diagram showing an overcurrent detection and alarm signal occurrence timing in the drive circuit shown in FIG. 6.

Herein, as shown in FIG. 3, when the current Ic flowing through the semiconductor switching element Q exceeds the preset reference voltage Vref1 which is a current limit value, each first alarm signal is generated after its detection response delay time. Also, when the current Id flowing through the free wheeling diode D exceeds the preset reference voltage Vref2 which is a current limit value, the second alarm signal is generated after its detection response delay. The respective pulse widths of the first and second alarm signals are set so as to be different with a large time difference, such as that between 2 ms and 4 ms, as shown in, for example, FIG. 3. In other words, the respective pulse widths of the first and second alarm signals are set so that it is possible for the control circuit to easily and accurately distinguish between the first and second alarm signals.

The control circuit, when receiving at least one of the first and second alarm signals notified from the power semiconductor module (IPM) 10 in this way, stops the drive of the power semiconductor module (IPM) 10, that is, the drive of the semiconductor switching elements Q1 to Q6. Also, at the same time, the control circuit, from the drive circuit A, which has notified of the alarm signal, and the pulse width of the alarm signal notified from the drive circuit A, determines whether an overcurrent has occurs in the upper-arm or lower-arm semiconductor switching elements Q1 to Q6.

The control circuit, by being restarted when a factor of the overcurrent occurrence in the semiconductor switching elements Q1 to Q6 is removed, restarts the on/off drive of the semiconductor switching elements Q1 to Q6. When a control signal is input again into the drive circuit A by the restart of the on/off drive, a reset circuit 17 provided in the input stage of the drive circuit A is started, thus resetting the first and second flip-flops 13 and 15. Further, the stop of the operation of the driver circuit 2 is cancelled, and the operation of the first and second alarm generation circuits 14 and 16 is stopped.

Thus, according to the power semiconductor module (IPM) 10 including the lower-arm drive circuit A (A4, A5, A6) configured in the way heretofore described, it is possible to easily and reliably notify the control circuit of information on an overcurrent occurring in the upper-arm semiconductor switching elements Q1, Q2, and Q3, from the lower-arm drive circuit A (A4, A5, A6), even without outputting an overcurrent detection alarm signal from the upper-arm drive circuit A (A1, A2, A3).

Consequently, in the previously described drive circuit which drives the power semiconductor module (IPM) 10, it is possible to respond promptly to even a case in which an overcurrent has occurred in the upper-arm semiconductor switching elements Q1, Q2, and Q3. That is, even though the upper-arm drive circuit A includes no alarm signal generation function, it is possible to respond promptly to an overcurrent occurring in the upper-arm semiconductor switching elements Q1, Q2, and Q3.

The invention is not limited to the heretofore described embodiment. Herein, a description has been given, as an example of the power conversion device main body, of the power semiconductor module (IPM) 10 in which is formed the three-phase full bridge circuit, but it goes without saying that the invention can also be similarly applied to, for example, a power conversion device main body configured including one or two sets of half bridge circuits. Also, the circuit configuration itself of an overcurrent detection portion can also appropriately employ an overcurrent detection method which has heretofore been variously proposed. Also, the form of the alarm signals is also not limited to the previously described examples shown in the embodiment. Apart from this, the invention can be implemented modified in various ways without departing from the scope thereof.

The invention claimed is:

1. A power conversion device, comprising:
    a power conversion device main body, including
        at least one pair of semiconductor switching elements, the semiconductor switching elements of each pair being connected in series to form a half bridge circuit that has a upper arm and a lower arm and that is interrelatedly on/off drivable, and
        a plurality of free wheeling diodes, each provided in reverse parallel to one of the semiconductor switching elements; and
    a plurality of drive circuits, each configured to on/off drive one of the semiconductor switching elements of the power conversion device main body, wherein
    each of the drive circuits includes an overcurrent protection circuit, which is configured to stop the on/off drive of the one semiconductor switching element that said each drive circuit is configured to on/off drive, when a current flowing through the one semiconductor switching element exceeds a first current limit value, and
    the drive circuit of the lower arm of each half bridge circuit further includes an alarm signal generation circuit configured to
        generate a first alarm signal when a current flowing through the semiconductor switching element of the lower arm exceeds the first current limit value, and
        generate a second alarm signal when a current flowing through the free wheeling diode connected in reverse parallel to the semiconductor switching element of the lower arm exceeds a second current limit value, and
    the drive circuit of the upper arm of each half bridge circuit is devoid of any alarm signal generation circuit that generates two alarm signals respectively when a current flowing through the semiconductor switching element of the upper arm exceeds the first current limit value, and when a current flowing through the free wheeling diode connected in reverse parallel to the semiconductor switching element of the upper arm exceeds the second current limit value.

2. The power conversion device according to claim 1, wherein the first and second alarm signals are signals with different pulse widths generated in a predetermined cycle.

3. The power conversion device according to claim 1, wherein
    each semiconductor switching element includes a current detection terminal for detecting a current flowing through the semiconductor switching element, and
    each free wheeling diode includes a current detection terminal for detecting a current flowing through the free wheeling diode.

4. An inverter device including the power conversion device of claim 1, the inverter device being configured to switch a direct current voltage and to supply to a load an alternating current formed of a pulsed discrete sine-wave current waveform.

5. The power conversion device according to claim 1, wherein the alarm signal generation circuit included in the drive circuit of the lower arm of each half bridge circuit includes
    a first alarm signal generation circuit configured to generate the first alarm signal,
    a second alarm signal generation circuit configured to generate the second alarm signal, and
    an OR circuit connected to the first and second alarm signal generation circuits for performing an OR operation on outputs of the first and second alarm signal generation circuits.

6. A power conversion device, comprising:
    first and second semiconductor switching elements, which are connected in series to form a half bridge circuit and are respectively disposed on upper and lower arms of the half bridge circuit;
    first and second free wheeling diodes respectively connected in reverse parallel to the first and second semiconductor switching elements; and
    first and second drive circuits configured to respectively on/off drive the first and second semiconductor switching elements, the second drive circuit including an alarm signal generation circuit configured to generate different alarm signals upon detecting overcurrent in different arms of the half bridge circuit, the first drive circuit being devoid of any alarm signal generation circuit that generates an alarm signal upon detecting overcurrent in the upper arm of the half bridge circuit.

7. The power conversion device of claim 6, wherein the alarm signal generation circuit is configured to
    receive first current flowing through the second free wheeling diode, to thereby detect the overcurrent in the upper arm of the half bridge circuit, and
    receive second current flowing through the second semiconductor switching element, to thereby detect the overcurrent in the lower arm of the half bridge circuit.

8. The power conversion device of claim 7, wherein the alarm signal generation circuit in the second drive circuit includes
    a first alarm signal generation circuit configured to generate a first alarm signal upon detecting the overcurrent in the lower arm of the half bridge circuit, a second alarm signal generation circuit configured to generate a second alarm signal upon detecting the overcurrent in the upper arm of the half bridge circuit, and an OR circuit connected to the first and second alarm signal generation circuits for performing an OR operation on outputs of the first and second alarm signal generation circuits.

9. The power conversion device of claim 6, wherein the different alarm signals have different pulse widths.

10. A power conversion device, comprising:
a plurality of pairs of semiconductor switching elements, each pair including first and second semiconductor switching elements that are connected in series to form a half bridge circuit and are respectively disposed on upper and lower arms of the half bridge circuit;
a plurality of pairs of free wheeling diodes, each pair corresponding to one of the half bridge circuits, and including first and second free wheeling diodes respectively connected in reverse parallel to the first and second semiconductor switching elements in the corresponding half bridge circuit; and
a plurality of pairs of drive circuits, each pair corresponding to one of half bridge circuits, and including first and second drive circuits configured to respectively on/off drive the first and second semiconductor switching elements in the corresponding half bridge circuit, the second drive circuit including an alarm signal generation circuit configured to generate different alarm signals upon detecting overcurrent in different arms of the corresponding half bridge circuit, the first drive circuit being devoid of any alarm signal generation circuit that generates an alarm signal upon detecting overcurrent in the upper arm of the corresponding half bridge circuit.

11. The power conversion device of claim 10, wherein the alarm signal generation circuit is configured to
receive first current flowing through the second free wheeling diode in the pair of free wheeling diodes corresponding to the corresponding half bridge circuit, to thereby detect the overcurrent in the upper arm of the corresponding half bridge circuit, and
receive second current flowing through the second semiconductor switching element of the corresponding half bridge circuit, to thereby detect the overcurrent in the lower arm of the half bridge circuit.

12. The power conversion device of claim 11, wherein the alarm signal generation circuit in the second drive circuit includes
a first alarm signal generation circuit configured to generate a first alarm signal upon detecting the overcurrent in the lower arm of the corresponding half bridge circuit,
a second alarm signal generation circuit configured to generate a second alarm signal upon detecting the overcurrent in the upper arm of the corresponding half bridge circuit, and
an OR circuit connected to the first and second alarm signal generation circuits for performing an OR operation on outputs of the first and second alarm signal generation circuits.

13. The power conversion device of claim 10, wherein the different alarm signals have different pulse widths.

* * * * *